United States Patent
Voorhees et al.

(10) Patent No.: US 8,539,096 B2
(45) Date of Patent: Sep. 17, 2013

(54) SYSTEMS AND METHODS FOR CONFIGURING PORTS OF AN SAS DOMAIN

(75) Inventors: William Voorhees, Colorado Springs, CO (US); Timothy Hoglund, Colorado Springs, CO (US); Stephen Johnson, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 2206 days.

(21) Appl. No.: 10/672,390

(22) Filed: Sep. 26, 2003

(65) Prior Publication Data

US 2005/0080881 A1    Apr. 14, 2005

(51) Int. Cl.
G06F 15/173 (2006.01)
G06F 15/177 (2006.01)
G06F 3/00 (2006.01)
G06F 13/00 (2006.01)

(52) U.S. Cl.
USPC ............ 709/238; 709/220; 709/222; 710/15; 710/300

(58) Field of Classification Search
USPC ................... 709/238, 220, 222; 710/300, 15
See application file for complete search history.

(56) References Cited

U.S. PATENT DOCUMENTS

| | | | | |
|---|---|---|---|---|
| 4,156,798 | A * | 5/1979 | Doelz | 700/4 |
| 5,335,227 | A * | 8/1994 | Smith et al. | 370/258 |
| 5,579,480 | A * | 11/1996 | Cidon et al. | 709/243 |
| 6,098,116 | A * | 8/2000 | Nixon et al. | 710/8 |
| 6,199,137 | B1 * | 3/2001 | Aguilar et al. | 710/305 |
| 6,301,642 | B1 * | 10/2001 | Jones et al. | 711/151 |
| 6,611,863 | B1 * | 8/2003 | Banginwar | 709/220 |
| 2002/0046266 | A1 * | 4/2002 | Muralidhar et al. | 709/220 |
| 2003/0076788 | A1 * | 4/2003 | Grabauskas et al. | 370/254 |
| 2003/0097438 | A1 * | 5/2003 | Bearden et al. | 709/224 |
| 2003/0217212 | A1 * | 11/2003 | Kim | 710/305 |
| 2005/0015532 | A1 * | 1/2005 | Beckett et al. | 710/105 |
| 2005/0066100 | A1 * | 3/2005 | Elliott et al. | 710/300 |
| 2005/0071532 | A1 * | 3/2005 | Bakke et al. | 710/300 |

* cited by examiner

*Primary Examiner* — Aravind Moorthy
(74) *Attorney, Agent, or Firm* — Duft Bornsen & Fettig LLP

(57) ABSTRACT

Systems and methods are provided for automatically configuring ports of devices within an SAS network domain. A domain control element, such as an SAS initiator, is coupled to a plurality of expander devices. The domain control element configures ports of the expander devices by traversing port connections between the expander devices to determine routing attributes of the ports. The domain control element automatically configures the ports to operate according to the routing attributes. In one aspect hereof, an initiator device of the SAS network domain serves as a control element to perform the automated configuration of routing attributes. In another aspect hereof, an expander device serves as a control element to configure routing attributes of the ports.

17 Claims, 6 Drawing Sheets

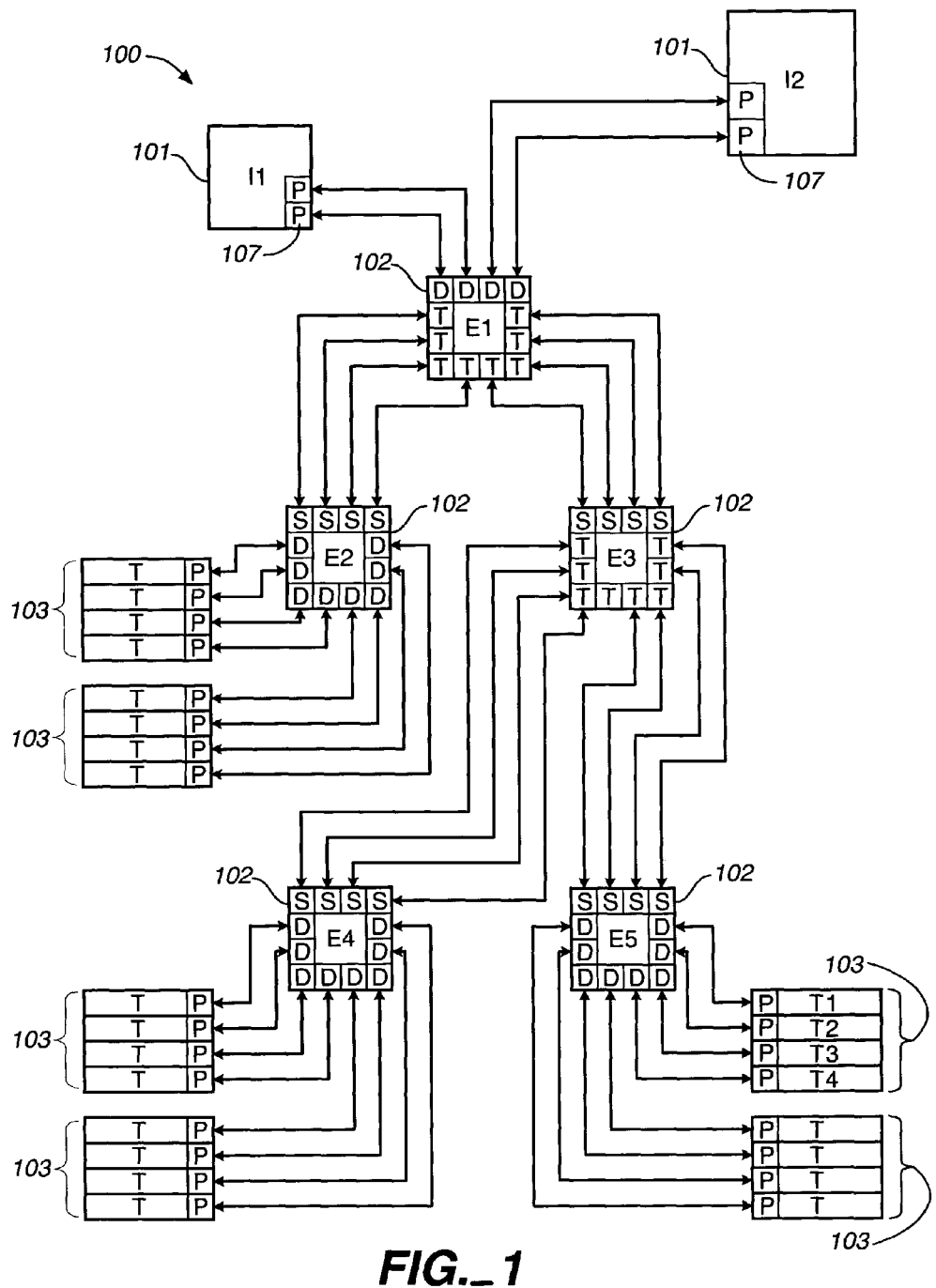
FIG._1

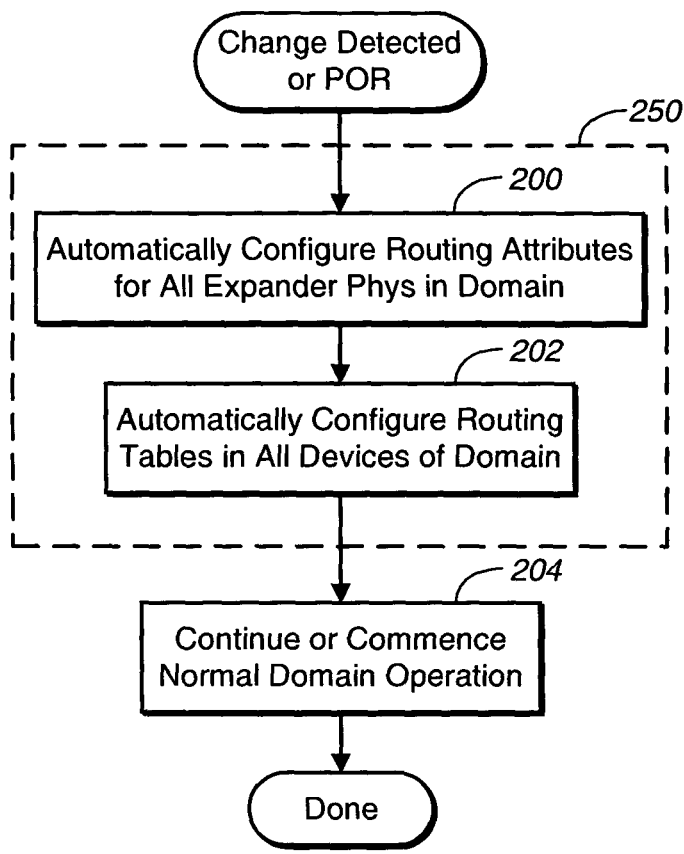
FIG._2

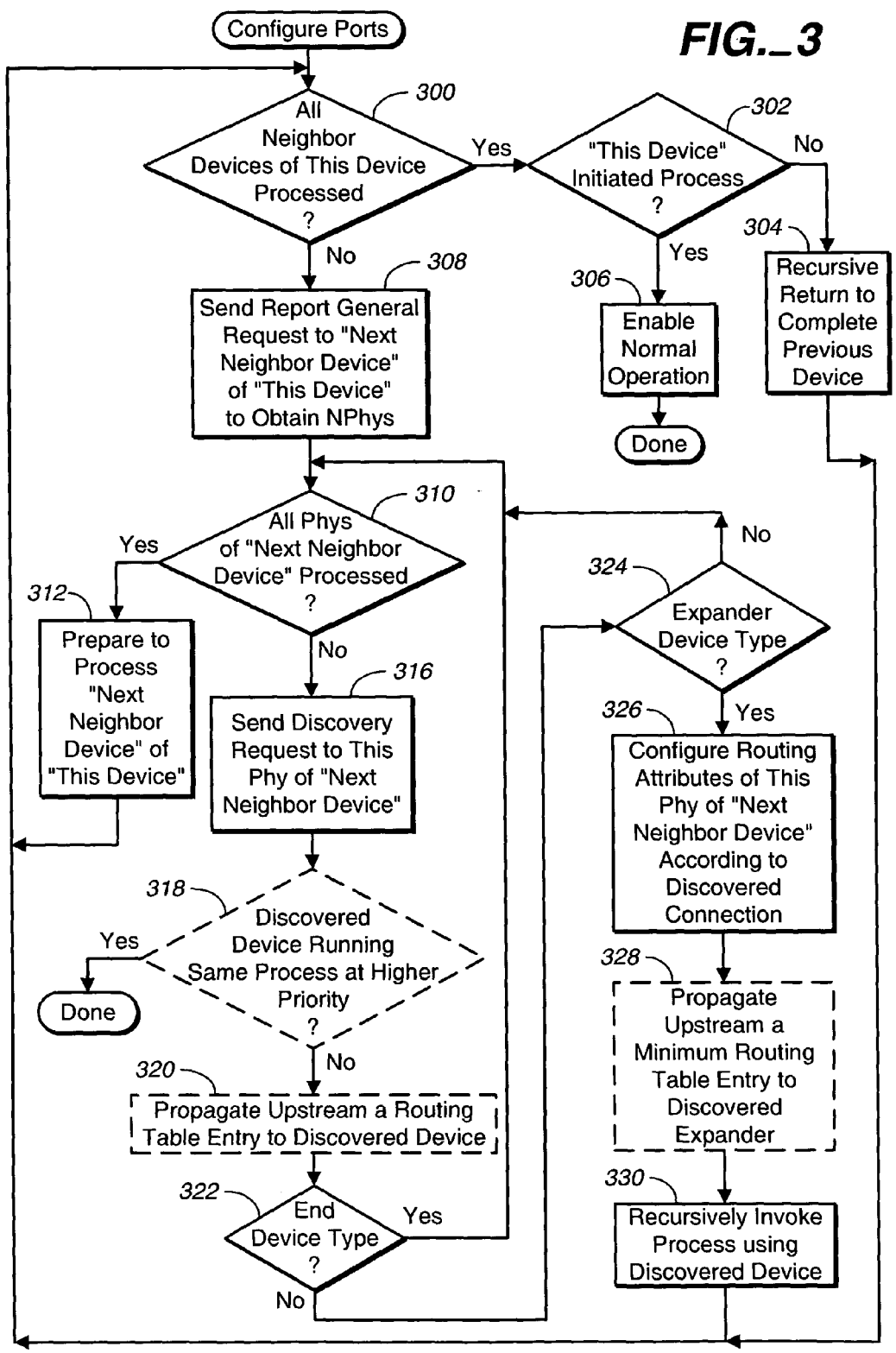
FIG._3

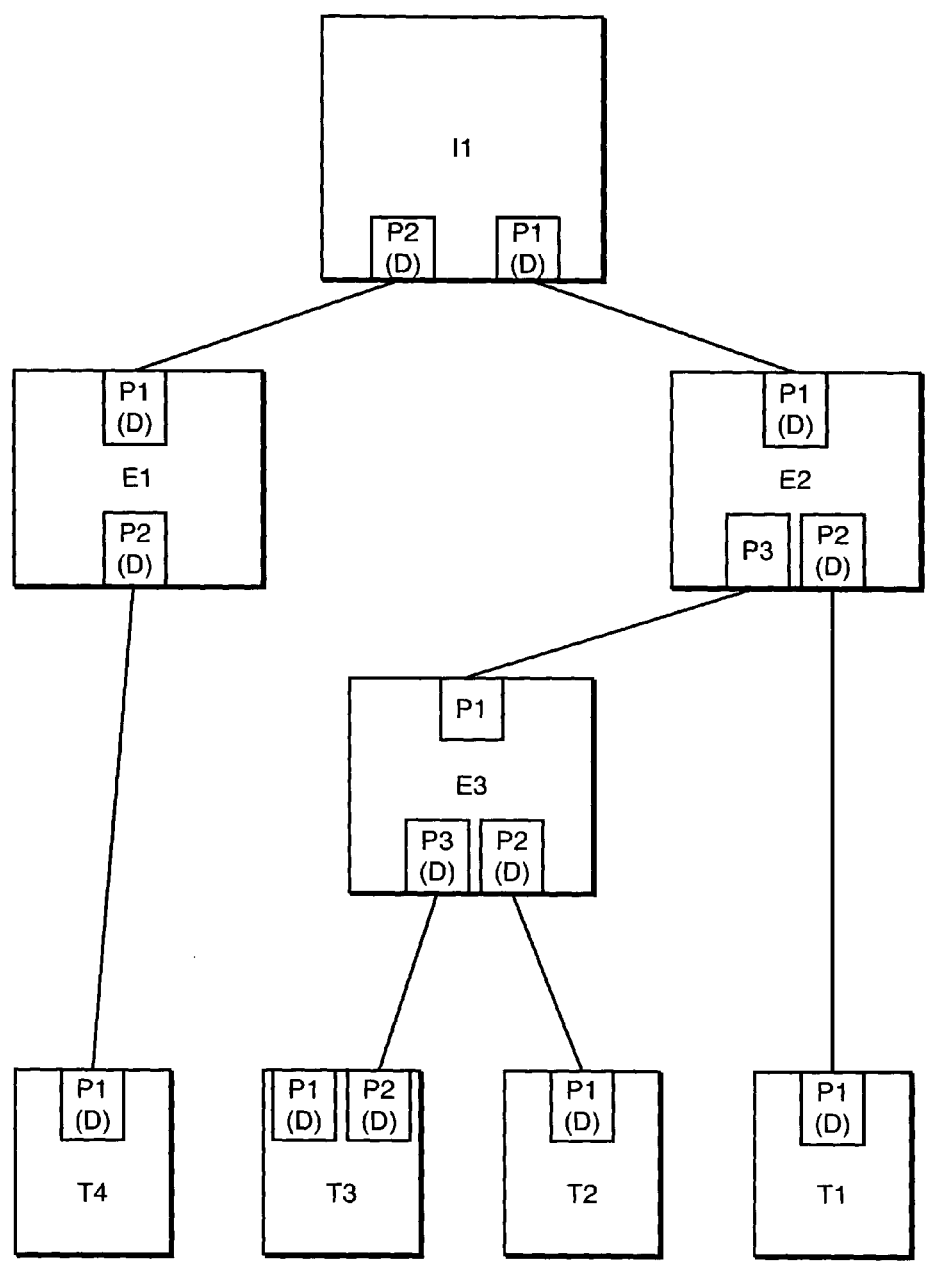
FIG._4

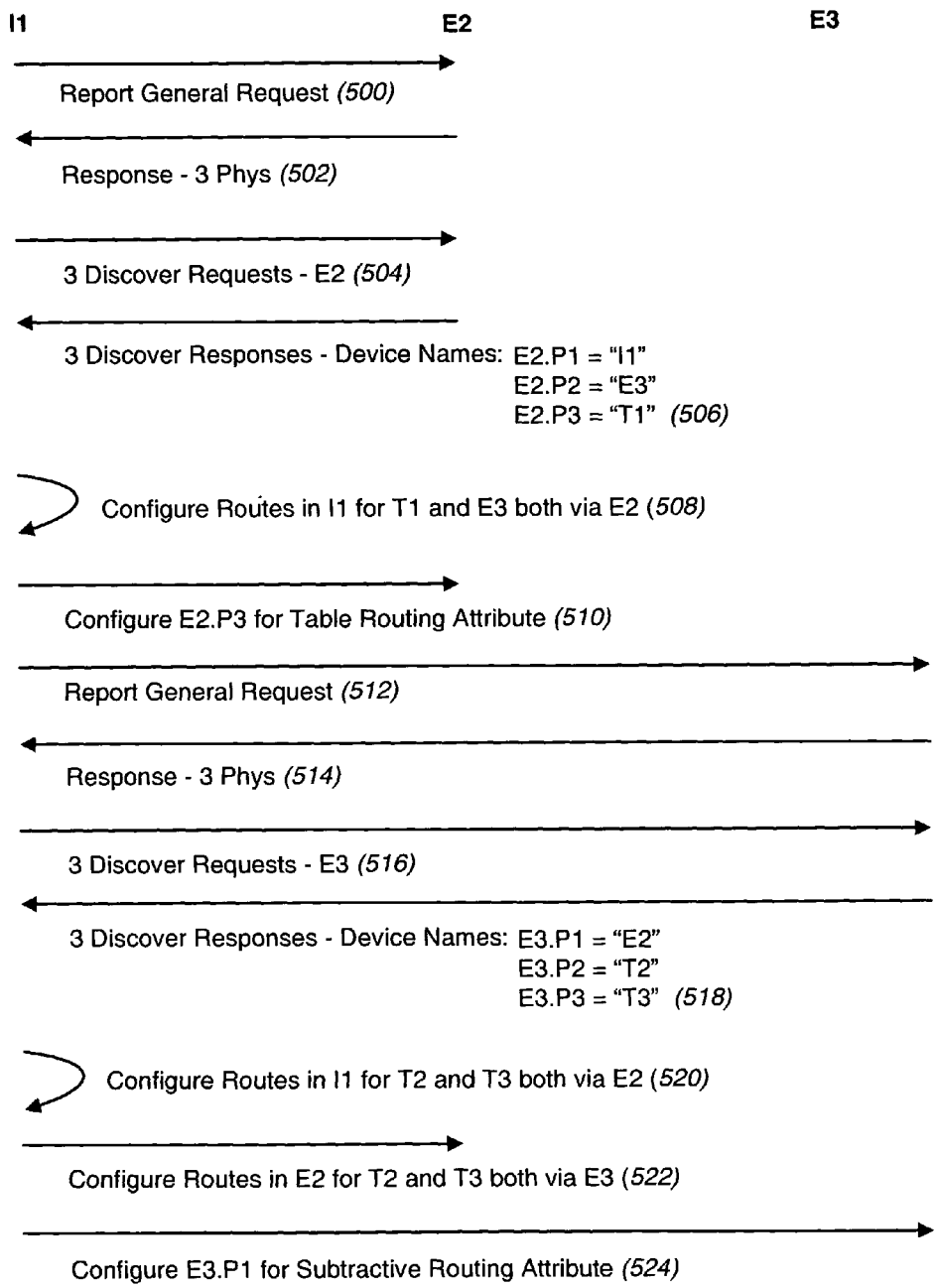
FIG._5

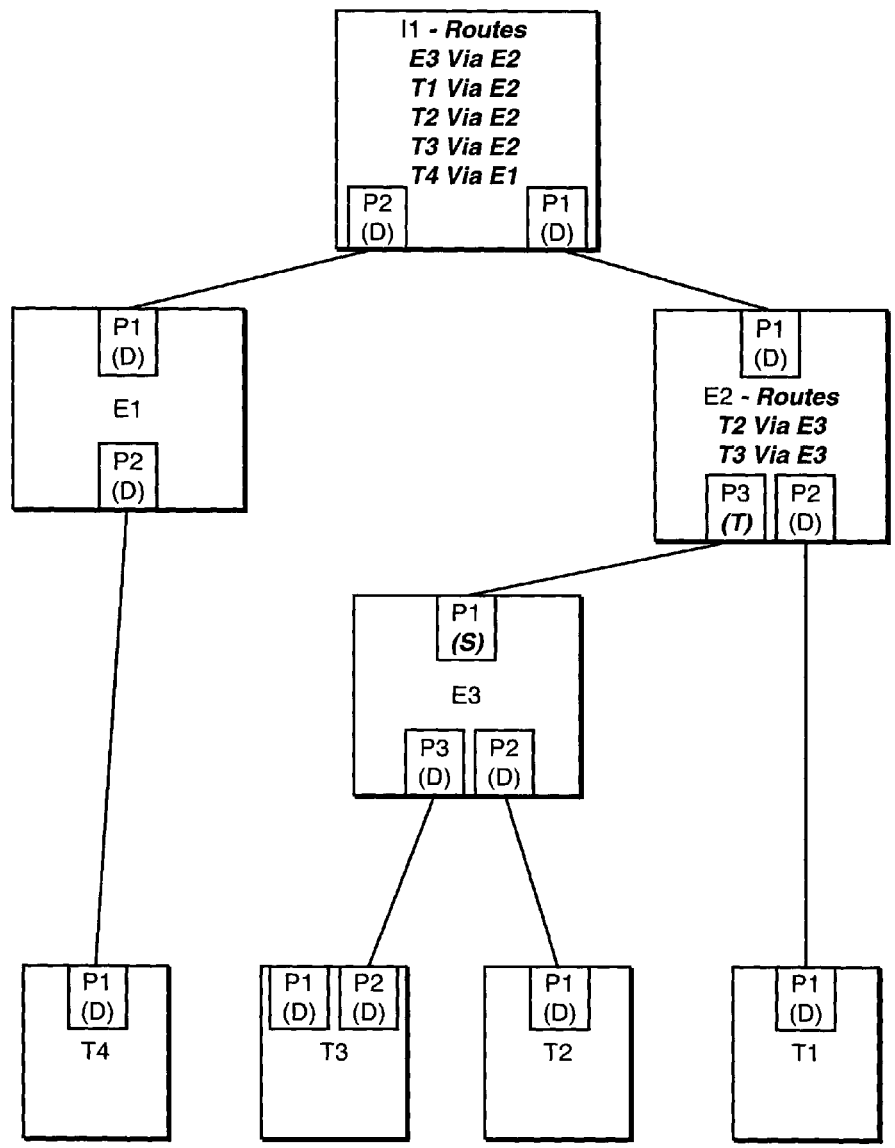
FIG._6

SYSTEMS AND METHODS FOR CONFIGURING PORTS OF AN SAS DOMAIN

BACKGROUND OF THE INVENTION

1. Field of the Invention

The invention generally relates to configuring ports of a storage domain. More specifically, the invention relates to configuring ports within a Serial Attached Small Computer Systems Interface ("SAS") domain to operate according to certain routing attributes.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, Compact Disc-Read Only Memory ("CD-ROM") drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. SCSI now refers to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP). SCSI interfaces and commands are also used to network storage devices with processing devices having serial interfaces such as Serial Attached SCSI ("SAS") and Serial Advanced Technology Attachment ("SATA"). These applications are often referred to as storage networks. Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands. Those skilled in the art are familiar with SAS and SATA standards as well as other SCSI related specifications and standards. Information about such interfaces and commands is generally obtainable at the website www.t10.org.

An SAS network typically comprises one or more SAS initiators coupled to one or more SAS targets via one or more SAS expander devices. In general, as is common in all SCSI communications, SAS initiators initiate communications with SAS targets. The expander devices expand the number of ports of an SAS network domain. The expander devices are often arranged such that the path from any SAS initiator to any particular SAS target may pass through multiple expander devices. In addition, there may exist multiple paths through the network of expanders to establish communications between a particular initiator and a particular target. The expander devices (as well as initiator devices) therefore also include routing tables that enable SAS initiators and SAS devices to route communications through the network of expander devices.

The SAS initiators may also perform as control elements of the network to control and configure the devices of the network for routing information and other attributes. For example, an SAS initiator may require information about a particular SCSI disk drive coupled to an expander device network. The SAS initiator, therefore, sends a SCSI command identifying the desired target device as the ultimate destination for the command. The initiator directs the command to an adjacent expander device of the expander device network. The expander device has routing tables in which it looks for the identified target device and thereby determines the next device along the path to the identified target—perhaps another expander. Each expander similarly consults its routing tables to forward the command further along a path toward the identified target until the intended disk drive target device receives the command. Status information or data generated by the target device to be returned to the initiator is similarly routed through the expander devices until it reaches the appropriate initiator of the SCSI command. Typically, subtractive routing is used to return the response along a path where table routing was used to direct the request. Those skilled in the art will note that table routing is always used in the case of a "fan-out" expander as provided in the SAS specifications.

Prior to commencing normal SAS network domain operations, a topology of the network domain must be identified so that an SAS initiator may correctly configure routing information to route commands and status through the expander device network. When the SAS network is initialized, an SAS initiator may perform a discovery process that determines the topology of the network domain and configures the routing tables of the expander devices within that domain. Such a discovery process may utilize a Serial Management Protocol ("SMP") Report General request and Discover request to determine the topology of the SAS domain (i.e., of the network). SMP protocols and commands are defined in the SAS standards and are used by SAS devices to communicate management information with other SAS devices in an SAS domain. In general, the topology of the network may be determined through the discovery process by a recursive traverse through all expander devices of the SAS domain. An example of such a recursive process is provided in an appendix of the SAS specifications generally available at the web site noted above.

As a preliminary step generally presumed to precede the discovery process, an administrator must set a "routing attribute" associated with each port of an SAS device—in particular the routing attribute needs to be set for each port (also referred to as a Phy) of each expander device. The SAS standards define a "routing attribute" associated with each port that generally indicates the direction of flow through the port as toward target devices or toward initiator devices. "Subtractive routing" as defined in the SAS specification refers to routing between expander devices in a consistent "non-changing" direction through an SAS network domain, such as all routing between expander devices flowing towards an SAS initiator. "Table routing" as defined in the SAS specification refers to routing between expander devices in an opposite direction of subtractive routing. "Direct routing" attribute indicates that the port is coupled directly to a port of an end device (an initiator or target device).

As presently known in the art, configuration of routing attributes of expander device ports or Phys is a manual process performed prior to the discovery process described above for discovering the topology of the SAS domain. When a new SAS domain is initially installed or when an existing SAS domain is altered by addition or subtraction of one or more expanders or other devices, the routing attributes of all ports of all expanders may require re-configuration. While SAS initiators and target devices typically do not require port route attribute configuration as they are able to configure their respective ports (they are always direct routing), expander devices presently require manual port configuration to associate the subtractive routing attributes and the table routing attributes with ports of the expanders. Since there can be as many as 128 ports or Phys in each SAS device and virtually any number of SAS devices within a single network domain, manually configuring the ports is a tedious and time consuming process and delays operation of the storage network. Further, manual processes for configuring the routing attributes of each port of each device are prone to human errors.

In view of the above discussion, it is evident that there is a need for improved systems and methods for configuring routing attributes of ports of an SAS network domain.

SUMMARY OF THE INVENTION

The present invention solves the above and other problems, thereby advancing the state of useful arts, by providing methods and associated structures to automatically configure routing attributes of ports of an SAS network domain. More specifically, one or more domain control elements automatically configure SAS routing attributes of ports for a plurality of expander devices within an SAS network domain such that routing tables of the expander devices can then be formatted. In one aspect hereof, a domain control element is communicatively coupled to the expander devices. The control element traverses the ports in each of the expanders of the domain setting routing attributes of ports as it proceeds. The automated configuration of routing attributes eliminates potential for human error inherent in previous manual processes and reduces delays as compared to such manual processes. In one aspect hereof, the control element may be a SAS initiator device. In another aspect, the control element may be a SAS expander device.

One feature hereof therefore provides an automated method of configuring routing attributes of ports within an SAS network domain, comprising: automatically discovering devices of the SAS network domain; automatically discovering ports of the discovered devices; and automatically configuring routing attributes of discovered ports.

Another aspect hereof further provides that the steps of discovering devices, discovering ports and configuring ports each include a step of exchanging SMP messages.

Another aspect hereof further provides for configuring routing table information within devices of the SAS network domain wherein said routing table information is sufficient to identify paths in the SAS network domain to enable the exchange of said SMP messages.

Another aspect hereof further provides for completely configuring routing table information to identify all paths for exchange of messages within the SAS network domain.

Another aspect hereof further provides that the step of completely configuring is substantially integrated with the steps of discovering devices, discovering ports and configuring ports.

Another aspect hereof further provides that the step of discovering devices further comprises: transmitting an SMP Discover request from a first device to a neighboring device of the first device; and receiving an SMP Discover response in said first device from said neighboring device identifying the other devices coupled to ports of said neighboring device.

Another aspect hereof further provides that the step of discovering ports of discovered devices further comprises: transmitting an SMP Report General request from a first device to a neighboring device of the first device; and receiving an SMP Report General response in said first device from said neighboring device identifying the number of ports within said neighboring device.

Another aspect hereof further provides that the step of configuring further comprises: transmitting an SMP request from a first device to a second device wherein the SMP request includes vendor unique information identifying a routing attribute to be configured for a port of said second device.

Another aspect hereof further provides for recursively repeating the steps of the method to traverse devices of the SAS network domain to configure routing attributes of ports of devices of the SAS network domain.

Another feature hereof provides for an SAS network domain, comprising: a plurality of expander devices providing a plurality of ports within the domain wherein each port may have an associated routing attribute; and a domain control element coupled to at least one of the plurality of expander devices operable to configure routing attributes of the plurality of ports, wherein the domain control element is operable to configure the routing attributes of the ports by traversing port connections between the expander devices.

Another feature hereof provides an SAS network domain comprising: means for discovering the topology of the SAS network domain by traversing port connections between devices of the domain; and means for configuring SAS routing attributes associated with ports of devices of the domain in response to discovery of the topology of the domain.

BRIEF DESCRIPTION OF THE DRAWINGS

FIG. 1 is a block diagram of an SAS network domain in which features and aspects hereof have configured routing attributes.

FIG. 2 is a flowchart illustrating a processing aspects hereof.

FIG. 3 is a flowchart illustrating further details of automated routing attribute configuration features and aspects hereof.

FIG. 4 is a block diagram of an SAS network domain in which ports of devices need be configured in accordance with features and aspects hereof.

FIG. 5 depicts a chronological sequence of SMP messages exchanged in accord with features and aspects hereof to provide automated routing attribute configuration.

FIG. 6 is a block diagram of the SAS network domain of FIG. 4 after automated routing attribute and routing table configuration has been performed in accord with features and aspects hereof.

DETAILED DESCRIPTION OF THE DRAWINGS

While the invention is susceptible to various modifications and alternative forms, a specific embodiment thereof has been shown by way of example in the drawings and will herein be described in detail. It should be understood, however, that it is not intended to limit the invention to the particular form disclosed; but rather, the invention is to cover all modifications, equivalents and alternatives falling within the spirit and scope of the invention as defined by the appended claims.

With reference now to the figures and in particular with reference to FIG. 1, an embodiment hereof is shown in SAS network domain 100. In this embodiment, SAS network domain 100 (i.e., through initiator device 101) can automatically configure ports to operate according to certain routing attributes. Such a configuration of ports may be performed prior to, or concurrently with, a discovery process as discussed above to discover the topology of the domain 100 and to determine routing tables for communicating between initiators and targets.

SAS network domain 100 includes SAS initiators 101, a plurality of expander devices 102 and a plurality of target devices 103. Ports of each device (101, 102 and 103) are shown with labels "D", "T" or "S" indicating completion of routing attribute configuration determined as "Direct routing attribute", "Table routing attribute" or "Subtractive routing attribute", respectively. Domain 100 illustrates an exemplary SAS network domain in which SAS initiators 101, such as SAS initiator I1, route data and/or control information through a network of expander devices 102 to various target devices 103. Exemplary of such target devices 103 are individual disk and tape drives as well as storage subsystems such as RAID storage systems and tape libraries. Accordingly, the SAS initiators 101 may direct read requests and/or write requests, to access data within target devices 103. In a related manner, data or status information generated by a target device 103 in response to such a request may be returned over the same or another path to the requesting initiator 101.

Expander devices 102 are configured for expanding a number of ports within SAS network domain 100. Each SAS device, such as initiators 101, expander devices 102 and target devices 103, in SAS network domain 100 is configured with a specific SAS address within the domain (also referred to herein as a device name, a GUID, or a World-Wide Name (WWN)). The number of SAS addresses within an SAS network domain is governed by SAS standards. In general, SAS addresses or WWNs are intended to be globally unique identifiers (GUIDs) in accordance with the applicable SAS standards.

In routine operations of the SAS network domain 100, a SAS initiator 101 performs as a domain control element that determines the topology of the network domain. For example, the domain control element initiator 101 (I1) sends an SMP Discover request to an adjacent expander device 102 (E1) upon initialization of SAS network domain 100. The discovery process operable within the control element traverses the topology of SAS network domain 100, issuing Discover requests and other SMP commands to determine connections among the expander devices 102. Based upon retrieved information from the discovery process, the SAS initiator configures routing tables within the expander devices 102 (and within initiator device 101) such that data and/or control information may be routed between the SAS initiators 101 and the target devices 103 via the network of expander devices 102.

As noted above, the discovery process as presently practiced presumes that all ports of all devices have been configured as to the type of routing attribute associated with each (i.e., direct, table or subtractive routing attribute values). As presently practiced, port configuration of routing attributes is manually performed.

In one feature hereof, SAS initiator 101 automatically configures routing attributes of all ports by similarly traversing port connections to determine connections between the ports and to thereby determine the topology of the SAS domain. The SAS initiator 101 may also thereby configure the ports of each expander connected to another expander device to operate according to appropriate routing characteristics (e.g., to operate as a subtractive routing port or as a table routing port based on a flow of traffic between the SAS initiator 101 and target devices 103). As noted, configuration of direct routing attribute ports is typically performed within each device as a part of the standard exchanges of frames between neighboring devices during reset operations. With the routing attributes of ports so determined by the automated features hereof, a discovery process as discussed above may then determine and configure routing tables to identify paths between initiators and targets through the various intermediate expander devices.

Either of SAS initiators I1 or I2 may perform the traversal algorithm. One or the other may be selected by any desired means as the preferred control element to perform the automated route attribute configuration. In another aspect hereof, multiple initiators I1 and I2 may begin the traversal processing to configure port attributes. Each initiator so processing the automated configuration process may discontinue the process (i.e., defer its processing) when it encounters another control element having a "higher priority." Such deferral avoids inconsistent results being configured by multiple configuration processes. Determining which of multiple initiators is "higher" or "lower" in priority and thus will defer its processing may be by any of several equivalent techniques. Since each initiator may discover the SAS address of the other, the higher SAS address initiator may defer to a lower SAS address initiator. Or, for example, a lower SAS address device may defer to a higher SAS address device. For example, SAS initiators I1 (lower SAS address) and I2 (higher SAS address) may both begin traversing SAS network domain 100. When I1 detects that I2 is also traversing SAS domain 100 (i.e., by discovering initiator I2 in its traversal of the SAS domain), I1 may defer to I2 to complete the traversal of SAS domain 100. The device that completes the configuration traversal process may therefore be referred to herein as "higher priority" or simply "preferred."

In traversing SAS network domain 100, the preferred SAS initiator may configure an SMP Report General request and/or a Discover request and transfer the request(s) to the expander device E1. In response to receiving the request(s), expander device E1 may respond with information about its ports. Among the information returned may be indications of the device name (i.e., WWN, SAS address or GUID) of the device attached to each port of expander E1. For example, a series of Discover requests directed to expander E1, accessing its ports in succession, will reveal that initiator I2 and expanders E2 and E3 are coupled to various of the ports of expander E1.

The control element (e.g., initiator I1) processes the response of expander device E1 and determines an appropriate routing configuration for each port (i.e., subtractive routing or table routing). In particular, in the example of FIG. 1, ports of E1 coupled to either E2 or E3 are configured as table routing ports as messages will generally be directed from initiators through these ports deeper into the SAS domain network. The SAS initiator may configure those ports through a vendor specific message to expander device E1. Certain SMP commands of the SAS standards have vendor specific fields that a vendor may tailor to meet the needs of the vendor's systematic design. Examples of such commands and vendor specific fields are generally known to those skilled in the art and are documented in SAS specifications.

The control element (e.g., initiator I1), having now "discovered" expander devices E2 and E3 are coupled to E1, may now issue similar SMP commands to each of expander devices E2 and E3. These commands traverse deeper into the SAS domain structure to allow the control element to continue configuring ports of expander devices. For example, as shown in FIG. 1, ports of E3 that are coupled to expander E1 may be configured by the control element for subtractive routing while the remaining ports of E3 are configured for table routing since the Discover response will indicate their coupling to expanders E4 and E5. In like manner, the control element may configure ports of E2, E4 and E5 to complete the process.

In one aspect hereof, the traversal of the SAS domain for purposes of configuring routing attributes may be performed as a separate process from the subsequent discovery process to determine and configure routing tables. However, in such an embodiment, some minimal routing information will be required to permit the complete traversal of the devices in the SAS domain for purposes of configuring routing attributes. For example, as expander devices are discovered and configured with appropriate routing attributes, devices already traversed in the SAS domain may have routing table entries configured to establish at least one path through each expander device to a next device deeper in the SAS domain hierarchy. In particular, when I1 (the control element) discovers that E4 and E5 are coupled to E3 by commands routed through E1 to E3, routing table entries may be configured within E1 indicating paths to E4 and E5 through E3. Such minimal routing table entries allow the continued traversal of expander devices in the SAS domain until all devices have been discovered and configured.

In another aspect hereof, the configuration of routing attributes and the generation and dissemination of complete routing table information may be integrated in a single process. Such a single process may traverse the SAS domain devices once but in that traversal may first configure routing attributes automatically and then generate and disseminate routing table entries. The generation and dissemination of routing table entries in such a discovery process is well known in the art and is exemplified in the above noted appendix of the SAS specifications.

In still another aspect hereof, expander devices 102 themselves may traverse the SAS domain to configure routing attributes of ports of expanders within the domain. Upon initialization, each of expander devices 102 may begin traversing SAS domain 100 using the processes noted above. As noted above with respect to multiple initiators performing the automated configuration process, when an expander device encounters another expander device with a "higher priority", the lower priority expander device may defer to the higher priority expander device to complete the automated configuration processing. For example, when expander device E2 encounters expander device E1 in SAS domain 100, expander device E2 may determine that expander device E1 has a higher SAS address. Accordingly, E2 may cease traversal of SAS domain 100, leaving E1 to continue traversing and configuring routing attributes of ports of discovered expander devices. During this configuration process, expander devices may keep all end devices from addressing the domain by rejecting any requests from end devices to open a connection. At the conclusion of the configuration process, vendor-specific SMP messages may be used by the higher priority expander to notify all other expanders in the domain that configuration is complete and that requests by end devices may now be serviced.

Further details of processing features and aspects hereof to provide automated configuration of routing attributes in a SAS domain such as exemplified in FIG. 1 are provided herein below. Those skilled in the art will recognize that features and aspects hereof should not be limited to the particular numbers of SAS initiators, expander devices and/or target devices shown in FIG. 1. Rather, the traversal processes and structures as described herein for automated routing attribute configuration may be applied to numerous combinations of SAS devices and SAS network domain configurations.

FIG. 2 is a flowchart providing a high level view of automated configuration features hereof. The method of FIG. 2 may be operable in response to a power on reset ("POR") of devices in a SAS domain or in response to detection of a change in the SAS domain topology by one of the SAS devices. As documented in SAS specifications, any device that detects a change in the SAS domain configuration may generate and broadcast a message indicating detection of a change. In response thereto, one or more SAS devices in the domain may initiate processing to discover the new topology of the SAS domain and, in accordance with features and aspects hereof, to configure routing attributes of ports of the SAS domain.

In response to detection of such a change, element 200 is first operable to automatically configure routing attributes for ports or Phys of the various devices of the SAS domain. As discussed above, present practice presumes that such routing attribute configuration is performed as a manual process prior to a discovery process used to determine and configure routing tables in all devices of a SAS domain. Following the automatic configuration of routing attributes by element 200, element 202 is operable to automatically configure routing tables in all devices of the SAS domain. As noted above, an exemplary discovery process for determining routing information for all devices of a SAS domain is provided as an appendix in SAS specifications and is therefore well known to those of ordinary skill in the art.

Element 204 continues or initially commences normal operation of the SAS domain following completion of the automatic configuration of routing attributes and the automatic discovery process to determine and configure routing tables for all devices of the SAS domain. As part of the processing of element 204, configuration information for routing attributes of each port or Phy of each device may be written to non-volatile configuration memory of each device. In addition, routing table entries generated by the discovery process may be written to the devices of the SAS domain. This configuration information permits the commencement or continuation of normal operations of the SAS domain devices to forward SCSI commands through the serial attached network of the SAS domain.

The dashed line 250 surrounding elements 200 and 202 represents an optional feature hereof wherein the automatic configuration of routing attributes may be combined with the automated discovery process for configuring routing tables such that both processes are performed as a single, unified operation traversing the devices of the SAS domain once. In addition, element 204 as noted above is operable to configure information determined by both processes (200 and 202) into associated configuration memories of each device of the SAS domain. Where the two processes are not tightly integrated as a single process, the configuration information so determined may be written as two distinct steps—routing attribute information may be written to the SAS devices as part of the processing of element 200 while routing table information may be written to the SAS device as part of the processing of element 202 or 204. Details of such design choices are discussed further herein below.

FIG. 3 is a flowchart providing additional details of exemplary embodiments of features and aspects hereof for automatic configuration of routing attributes associated with ports or Phys of devices in a SAS domain. Numerous optional design choices and alternatives are depicted within the elements of FIG. 3 as discussed further herein below.

In the exemplary embodiments presented in FIG. 3, the process is implemented as a recursive algorithm performing a depth-first traversal of the devices in the SAS domain. The depth-first traversal commences from a predetermined topmost device of the SAS domain hierarchy. Routing attributes are, in general, determined and configured relative to an identified SAS initiator device in the SAS domain. However, as discussed further herein below, the configuration algorithm may operate within any device of the SAS domain so long as the routing attribute configuration is properly determined as routing attributes relative to some SAS initiator of the domain. The top-most initiator may be determined, as noted above, based on a priority determination. A highest priority initiator device of the SAS domain may be identified by, for example, the highest SAS address (i.e., WWN, device name or GUID) among all initiator devices, or, for example, as the lowest SAS address among all the initiator devices.

As noted above with respect to FIG. 2, the routing attribute configuration process of FIG. 3 may be operable in response to POR or other reset of devices of the SAS domain or may be operable in response to a detected change in the topology of the SAS domain.

In general, the method of FIG. 3 is operable to process each neighbor device of the SAS device performing the process. For each neighboring expander device, an SMP Report General request is formulated and transmitted to determine the number of ports or Phys associated with that device. In addition, an SMP Discover request returns additional information for a device indicating the device name of each device attached to a port or Phy of the responding device. For each port or Phy of a neighboring expander device, the process is recursively invoked to look for neighbors of that neighboring device and so on. As devices are discovered along the traversal of the SAS domain and the type of the device is determined, the routing attributes for each port may be determined and configured. This automated approach eliminates the errors and delay inherent in manual processes presently practiced.

Element 300 is first operable with respect to a present device from which the process is operating (referred to in FIG. 3 as "This Device") to determine whether additional neighboring devices remain to be processed. If all neighboring devices of This Device have been processed, elements 302 through 306 are operable to perform a return for the present invocation of the recursive process. As noted above, in the depicted exemplary embodiment, a recursive algorithm may be used to provide a depth-first traversal of all devices in the SAS domain. Elements 302 through 306 therefore provide for a return from the present level of recursive invocation to a previous level of recursive invocation. The topmost level of invocation therefore completes the recursive processing and completes the process of FIG. 3. Such recursive programming paradigms are well known to those of ordinary skill in the art. In particular, as shown in FIG. 3, element 302 determines whether the present invocation of the process is the topmost initiating invocation of the recursive algorithm. If not, element 304 performs a recursive return from the present invocation level to an previous recursive invocation level to complete processing of a previous device. Processing then continues by looping back to element 300 to continue processing at an earlier recursion level. If element 302 determines that the present recursive level is the highest level of the recursive hierarchy, element 306 is then operable to signify completion of the automated routing attribute configuration operation. Element 306 permits commencement or continuation of normal operation of devices in the SAS domain.

If element 300 determines that additional neighboring devices of This Device remain to be processed, element 308 is operable to formulate and transmit an SMP Report General request to the "Next Neighboring Device" of This Device. As known in the art and as documented in SAS specifications, a Report General request returns, among other items of information, the number of ports or Phys associated with the device processing and responding to the Report General request. Further, as is known in the art, each device of a SAS domain is aware of its direct neighboring devices. As part of the Phy Reset Sequence (described in the SAS specifications), Identify Frames are exchanged between neighboring devices whose Phys are directly coupled. With such information, element 308 may transmit a request for information to each of the direct neighbors of This Device without requiring routing table entries to determine a path to forward such a message. However, as requests descend deeper into the hierarchy of the SAS domain, at least some minimal routing information is useful as discussed further herein below.

The process next iterates through each of the ports or Phys of the responding Next Neighbor Device. In particular, element 310 determines if all Phys of the present Next Neighbor Device have been processed. If so, element 312 is operable to prepare for processing of another Next Neighbor Device of This Device. Processing then continues by looping back to element 300 for processing of remaining neighbors, if any, of This Device.

If element 310 determines that additional ports or Phys of the present Next Neighbor Device remain to be processed, element 316 is operable to formulate and transmit an SMP Discovery request to the present port or Phy of the present Next Neighbor Device. As is known in the art and as documented in the SAS specifications, a Discovery request retrieves information from the identified device. Among the information returned from such a request is the globally unique identifier (i.e., WWN, GUID, device name or SAS address) of the device coupled to a port or Phy of the identified Next Neighbor Device.

As noted above, multiple devices in the SAS domain may initiate the processing depicted in this FIG. 3. In such an embodiment, a first device of the multiple devices may complete the automated configuration process while other devices should defer to the first device. As further noted above, such a determination of which device may complete the process may be based on any of numerous prioritization factors. For example, a higher SAS address may be deemed to be a higher priority as compared to another device with the lower SAS address. Conversely, a lower SAS address could be deemed to be a higher priority than a higher SAS address. Those of ordinary skill in the art will readily recognize that any prioritization scheme may be utilized to determine which of multiple SAS devices should be permitted to complete processing of the configuration process. Element 318 is therefore operable to determine from the returned information in response to a Discovery request whether a newly discovered device coupled to a port or Phy of the Next Neighbor Device indicates that it has a higher priority than the device in which the process is presently operating. If so, the process completes within the present device by deferring to the higher priority device to complete the routing attribute configuration process. The dashed lines of element 318 indicate that it represents an optional design choice element that may be excluded where other techniques are utilized to determine which SAS device will perform the automated configuration process of this FIG. 3. Numerous other approaches for selecting a device to complete the processing will be readily apparent to those of ordinary skill in the art.

Processing may continue in the higher priority device at element 320 by propagating upstream from This Device routing table information useful for configuring routing tables entries in hierarchically higher devices. As used herein, "upstream" refers to transmitting routing table information to expander devices previously processed in the recursive processing of this FIG. 3.

As noted above, generation and transmission of routing table entries in the SAS domain may be integrated with the automated configuration features and aspects hereof for configuring the expander Phys' routing attributes. Alternatively, the routing attribute configuration processes hereof may be performed as a separate preliminary step before discovery processing is used as exemplified in the SAS specifications to generate and propagate routing table entries. The dashed lines surrounding element 320 indicate that it is an optional design choice where the configuration of routing attributes is to be closely integrated with generation and propagation of routing table information. Where automated routing attribute configuration is performed as a preliminary step independent of all routing table generation and propagation, processing of element 320 may be skipped.

Element 322 is then operable to determine whether the device attached to the responding port or Phy of the Next Neighbor Device indicates that it is an end device type. An end device type, as known in the art and as provided in the SAS specification, is either an initiator device or a target device—i.e., start and end points for SCSI command exchanges through the SAS domain. If element 322 determines that the newly discovered device is an end device type, no further processing is necessary to configure the routing attribute of the port and processing continues by looping back to element 310 to process additional ports or Phys of the present Next Neighbor Device. Otherwise, element 324 determines whether the newly discovered device is an expander device type (either an expander or a fan-out expander). If not (i.e., the port is not in use), no further processing is necessary for this port or Phy of the present Next Neighbor Device and processing continues by looping back to element 310 to process any additional ports or Phys of the present Next Neighbor Device.

If element 324 determines that the newly discovered device is an expander device, element 326 is operable to configure routing attributes of the Phy of the Next Neighbor Device and that of the newly discovered expander port. For example, the present port of the Next Neighbor Device is configured for Table Routing attribute while the corresponding port of the newly discovered expander device is configured for Subtractive Routing attribute (or for Table Routing where the newly discovered expander is a fan-out expander device). SMP commands containing vendor unique fields may be used for this purpose as noted above. Such commands and their respective fields are known to those of ordinary skill in the art and are documented in the SAS specifications.

As noted above, inclusion of optional element 320 allows routing attribute configuration processing to be integrated with the known discovery process used for generating and propagating routing table entry information. Even if the routing attribute configuration process of FIG. 3 is not so integrated with generation and propagation of routing table entries, some minimal routing information is useful to continue the recursive, depth-first traversal from the device performing the process of FIG. 3 through the newly discovered expander device. In that case, element 328 is next operable to generate and propagate upstream minimum routing table information required to permit the recursive process to continue the depth-first, hierarchical traversal of devices in the SAS domain. Lastly, having discovered yet another expander device in the hierarchical SAS domain, element 330 is next operable to recursively invoke the same process but using the present Next Neighbor Device as This Device and using the newly discovered expander device as a Next Neighbor Device. The process then continues with element 330 by invoking the same recursive process until all SAS devices of the SAS domain have been discovered and have had their respective routing attribute values set for each port or Phy associated there with.

As new General Report requests and Discover requests are generated and transmitted, the minimal routing information generated by element 328 or the full routing information generated by element 320 is may be relied upon to assure that the SMP messages are forwarded through the SAS domain to the next device to be discovered and configured.

The exemplary processes discussed above may also be understood with the aid of a configuration example. FIG. 4 depicts a simple, exemplary SAS domain including a single initiator ("I1"), four target devices ("T1", "T2", "T3" and "T4") and three expander devices coupling the target devices to the initiator ("E1", "E2" and "E3"). As depicted, initiator I1 has two ports or Phys—ports P1 and P2. Targets T1 and T2 each have a single port while target T3 has two ports. Expanders E2 and E3 each have three ports while expander E1 has two ports.

As shown in FIG. 4, initiator device I1 and target devices T1, T2 and T3 each configure their respective ports with routing attributes as "Direct" or as end device types. In like manner, each expander (E1, E2 and E3) configures the port attribute as "Direct" (or "D") for any port directly coupled to an initiator device or a target device. This minimal information for Direct routing attribute configuration is readily available to each SAS device by virtue of the standardized information transmitted in Identify frames exchanged as a part of standard power on or other reset processing. Each device in a SAS domain exchanges such Identify frames with its direct neighbors to determine what type of device is coupled as an neighbor on each of its ports. This Identify frame information is sufficient for each device to exchange further messages with any of its direct neighbors and represents, in effect, routing information to transfer messages to any of its direct neighbors, or to forward messages from a first neighbor to a second neighbor. Details regarding structure and content of Identify frame messages are provided in the SAS specifications.

As can be seen in FIG. 4, port P3 of expander E2 and port P1 of expander E3 do not have a routing attributes associated with therewith. Whereas prior processes would require manual procedures to configure the routing attributes for these ports, features and aspects hereof allow for automated configuration of these and other routing attributes.

As noted above, automated routing attribute configuration features hereof may operate within initiator devices of the SAS domain or may operate within expander devices of the SAS domain. Further, as noted above, the processing may commence in multiple devices (i.e., multiple initiators or multiple expanders) but only one of the devices will complete the process. Other devices will defer to a first, higher priority, device operating processes hereof.

FIG. 5 represents an exemplary exchange of messages to permit automated configuration of routing attributes in expander devices of the exemplary SAS domain of FIG. 4. These exemplary message exchanges of FIG. 5 presume that the process for automated configuration is operable within initiator I1 as shown in FIG. 4. Those of ordinary skill in the art will recognize that the message exchange depicted utilizes SMP messages to configure routing attributes in the above identified ports lacking such configuration. As a matter of design choice, other messages may be exchanged within the SAS domain to perform the process for such automated routing attribute configuration. For example, all messages may be vendor defined messages representing out-of-band messages for the SAS domain media and protocols.

FIG. 5 depicts a chronological sequence of messages exchanged between SAS devices I1, E2 and E3 as shown in FIG. 4. Relative time of the chronological sequence of messages progresses in the downward direction of the figure. The sequence depicted represents a relevant portion of an exemplary message exchange involved in features and aspects hereof to permit automated routing attribute configuration. In FIG. 5, three devices (I1, E2 and E3) are shown as column headers near the top of the figure. As time progresses downward from top to bottom in the figure, each message is indicated by a directed arrow from a first device transmitting the message to a second device receiving the message. Descriptive information regarding a message appears underneath each corresponding arrow providing some detail of the message content and meaning.

As shown in FIG. 5, a port ("Pn") of a device (i.e., Im, Em, or Tm) may be referred to herein using the notation "Im.Pn", "Em.Pn" or "Tm.Pn" (where m and n are device and port numbers, respectively). For example, I1.P1 refers to port P1 of initiator device I1. Further, the Device Name (i.e., WWN, GUID or SAS address) for a device is indicated by the same identifier shown in the figure but in quotes. For example, the WWN for device E1 is denoted herein as "E1."

Referring again to FIG. 5, message 500 is an SMP Report General request directed from initiator I1 to expander E2. Message 502 is the response generated by expander E2. As specified in the SAS specifications, the response to the Report General request provides the total number of ports or Phys presently in use by the responding device (here 3 ports on expander device E2).xx.

Next, three SMP Discover Request messages 504 are directed from initiator I1 to expander E2. Three such Discover requests are forwarded from I1 to E2 in response to the Report General Response discussed above indicating three Phys on expander E2. Message 506 represents the Discover Responses generated thereto and directed from expander E2 back to initiator I1. Each Discover Response includes the Device Name of a corresponding device attached to each port of the responding device—here expander E2. In particular, in the example of FIG. 4, expander E2 reports in a first response that on its port P1 is attached device "I1"; reports in a second response that on its port P2 is attached device "E3" and reports in a third response that on its port P3 is attached device "T1". Those of ordinary skill in the art will recognize that Discover Requests and corresponding Discover Responses are typically sent and received, respectively, in alternating sequence. The multiple requests and responses are shown as a sequence of requests followed by a sequence of responses for simplicity of the figure.

Having received these Discovery Responses from expander E2, initiator I1 may configure its internal target list indicating that devices T1 and E3 are both accessible through expander E2. Such a configuration message is indicated by curved arrow 508 the curved nature of which indicates processing within initiator I1 (i.e., no message need be sent between I1 and any other device). As noted above, configuration of routing table entries (or internal target lists) may be minimally performed to permit continued operation of the routing attribute configuration features hereof or may be complete routing table configuration where the processes hereof are integrated with an existing discovery process for generation and dissemination of routing information.

In view of the Discover response received at message 506, initiator I1 may transmit message 510 to expander device E2 requesting that it configure its port P3 with a table routing attribute. As noted above, such a message may be an SMP message with vendor unique information requesting configuration of such a routing attribute. The command may include directions for the receiving device to program its non-volatile memory to configure the indicated routing attribute or the message may itself implement the required re-programming of programmable memory within the receiving device.

Initiator I1 is now aware of another expander device in the SAS domain, namely, expander E3 coupled to expander E2. Processing features hereof may therefore recursively invoke the same process to descend deeper in the traversal of the SAS domain structure. In particular, the recursive invocation may exchange similar messages with expander E3 to discover more of the topology of the SAS domain. Following such a recursive invocation, message 512 may be generated and represents a Report General request transmitted from initiator I1, routed through expander E2, and addressed to expander E3. In response thereto, expander E3 generates response message 514 indicating that expander E3 has three ports or Phys. Such a response from E3 is returned via expander E2 to initiator I1. Initiator I1 next generates three Discover Request messages 516 addressed to expander device E3 and transmitted through expander E2. Three Discover Requests are generated in response to the Report General Response indicating three Phys on the expander E3. Expander device E3 then generates Corresponding three Discover Responses in message 518 indicating the device name of every device attached to its presently active ports. In particular, expander E3 indicates in a first response message that its port P1 is attached to expander device "E2", indicates in a second response message that its port P2 is attach to target device "T2" and indicates in a third response message that its port P3 is attached to target device "T3". As above, those of ordinary skill in the art will recognize that Discover Requests and corresponding Discover Responses are typically sent and received, respectively, in alternating sequence. The multiple requests and responses are shown as a sequence of requests followed by a sequence of responses for simplicity of the figure.

As above, having received such information, initiator I1 may add entries in its internal target list indicating that target devices T2 and T3 are known to be accessible via expander E2 (and thence via expander E3). Such a configuration process is indicated as message 520 and a curved arrow representing processing within initiator I1 to configure its own routing table entries or internal target lists. In addition, initiator I1 transmits message 522 to expander device E2 providing routing table entries to be added within expander E2 indicating that target devices T2 and T3 are both accessible via expander E3. Also as above, the routing information may be minimal information to permit completion of the routing attribute configuration features hereof or may be complete routing information where processes hereof are integrated with known discovery processing. Lastly, initiator I1 generates message 524 addressed to expander E3 indicating that its port P1 is to be configured with the subtractive routing attribute. Such a determination is now possible for initiator I1 in view of its understanding that expander E2 is coupled to expander E3 to thereby permit forwarding of messages to further target devices T2 and T3.

Recursive operations of initiator I1 may then return to complete other processing in the topology discovery and attribute configuration of SAS domain 400 of FIG. 4. Upon completion of such processing, FIG. 6 shows exemplary SAS domain 400 with routing attribute configuration completed in all expander ports—namely port P3 of expander E2 and port P1 of expander E3. Specifically, E2.P3 is configured for table routing attribute while E3.P1 is configured for subtractive routing attribute.

In addition as shown in FIG. 6, routing information in routing table entries associated with initiator I1 and expander E2 may be completed by the processing described above. As discussed above, the generation and propagation of routing table entries and the automated routing attribute configuration features and aspects hereof may be integrated as a single process or may be implemented as distinct processes. Therefore, routing entries generated and propagated as described herein with respect to FIG. 5 may be complete routing information where the routing attribute features hereof are tightly integrated with the SAS discovery process described in SAS specification. Alternatively, the routing table entries described herein with respect to FIG. 5 may be minimal routing table entries to permit completion of the routing attribute configuration as a step preceding the complete routing table generation of the SAS discovery process.

Those of ordinary skill in the art will recognize that FIGS. 4 through 6 are merely intended as exemplary of a simple SAS domain and processing features and aspects hereof to provide automated routing attribute configuration. Those of ordinary skill in the art will further recognize that the exemplary processing described herein may be readily expanded to more complex SAS domains with any number of expander devices in the network. In addition, those of ordinary skill in the art will recognize both recursive and non-recursive programming techniques that may be utilized to implement features and aspects hereof. Still further, those of ordinary skill in the art will recognize that the processing features and aspects hereof may be equivalently implemented as suitably programmed instructions in a general or special purpose processor or may be implemented as electronic circuits specifically designed for providing at least the processing features described herein.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An automated method of configuring routing attributes of ports within a Serial Attached SCSI (SAS) network domain, comprising:
    performing a recursive configuration process managed by a SAS control element, comprising:
        selecting a port of a first SAS device;
        determining, via SMP communications between the selected port and a directly coupled port of a second device, whether the second device is a SAS expander or an end device;
        responsive to determining that the second device is an end device, configuring routing attributes of the selected port for direct routing;
        responsive to determining that the second device is a SAS expander,
            if the first SAS device is an end device, configuring routing attributes of the directly coupled port for direct routing, and
            if the first SAS device is a SAS expander, configuring routing attributes of the directly coupled port for subtractive routing, and configuring routing attributes of the selected port for table routing; and
        recursively performing the configuration process upon ports of the second device, wherein the second device stands in for the first SAS device when the configuration process is recursively performed.

2. The method of claim 1 wherein the steps of the configuration process further comprise:
    determining a priority of the SAS control element; and
        determining, via SMP communications between the selected port and a directly coupled port of a second device, whether the second device is an other SAS control element;
    responsive to determining that the second device is an other SAS control element, determining whether the SAS control element has a lower priority than the other SAS control element and
    responsive to determining that the SAS control element has a lower priority than the other SAS control element, halting the method.

3. The method of claim 2 wherein:
    priority is determined based upon SAS addresses of the SAS control elements.

4. The method of claim 1 wherein:
    the steps of the configuration process, when recursively performed, completely configure routing attributes to identify all paths for exchange of messages within a SAS network domain.

5. The method of claim 4 wherein the configuration process is integrated with the steps of discovering devices, discovering ports, and configuring ports.

6. The method of claim 1 wherein determining whether the second device is an end device or a SAS expander comprises:
    transmitting an SMP Discover request to the second device; and
    receiving an SMP Discover response from the second device.

7. The method of claim 1 wherein the configuration process further comprises:
    responsive to determining that the second device is a SAS expander, determining a number of ports at the SAS expander by:
        transmitting an SMP Report General request to the second device; and
        receiving an SMP Report General response from the second device.

8. The method of claim 1 wherein configuring routing attributes of a port of the second device comprises
    transmitting an SMP request from the SAS control element to the second device wherein the SMP request includes vendor unique information identifying a routing attribute to be configured for the port of the second device.

9. A SAS network domain, comprising:
    a plurality of SAS expander devices;
    a plurality of end devices; and
    a SAS control element operable to perform a recursive configuration process comprising:
        selecting a port of a first SAS device;

determining, via SMP communications between the selected port and a directly coupled port of a second device, whether the second device is a SAS expander or an end device;

responsive to determining that the second device is an end device, configuring routing attributes of the selected port for direct routing;

responsive to determining that the second device is a SAS expander,
- if the first SAS device is an end device, configuring routing attributes of the directly coupled port for direct routing, and
- if the first SAS device is a SAS expander, configuring routing attributes of the directly coupled port for subtractive routing, and configuring routing attributes of the selected port for table routing; and recursively performing the configuration process upon ports of the second device, wherein the second device stands in for the first SAS device when the configuration process is recursively performed.

10. The SAS network domain of claim 9 wherein the SAS control element comprises:
a SAS initiator device coupled to the second device.

11. The SAS network domain of claim 9 wherein the SAS control element comprises:
a SAS expander device coupled to the second device.

12. A non-transitory computer readable medium embodying programmed instructions which, when executed by a processor, are operable for performing a method of configuring routing attributes of ports within a Serial Attached SCSI (SAS) network domain via a SAS control element, the method comprising:

performing a recursive configuration process managed by a SAS control element, comprising:
selecting a port of a first SAS device;
determining, via SMP communications between the selected port and a directly coupled port of a second device, whether the second device is a SAS expander or an end device;
responsive to determining that the second device is an end device, configuring routing attributes of the selected port for direct routing;
responsive to determining that the second device is a SAS expander,
- if the first SAS device is an end device, configuring routing attributes of the directly coupled port for direct routing, and
- if the first SAS device is a SAS expander, configuring routing attributes of the directly coupled port for subtractive routing, and configuring routing attributes of the selected port for table routing; and recursively performing the configuration process upon ports of the second device, wherein the second device stands in for the first SAS device when the configuration process is recursively performed.

13. The medium of claim 12 wherein the steps of the configuration process further comprise:
determining a priority of the SAS control element; and
determining, via SMP communications between the selected port and a directly coupled port of a second device, whether the second device is an other SAS control element;
responsive to determining that the second device is an other SAS control element, determining whether the SAS control element has a lower priority than the other SAS control element and
responsive to determining that the SAS control element has a lower priority than the other SAS control element, halting the method.

14. The medium of claim 12 wherein:
priority is determined based upon SAS addresses, and the SAS control element with the highest SAS address has the highest priority.

15. The medium of claim 12, wherein:
priority is determined based upon SAS addresses, and the SAS control element with the lowest SAS address has the highest priority.

16. The medium of claim 12, wherein:
the configuration process, when recursively performed, completely configures routing attributes to identify all paths for exchange of messages within a SAS network domain.

17. The medium of claim 12, wherein determining whether the second device is an end device or a SAS expander comprises:
transmitting an SMP Discover request to the second device; and
receiving an SMP Discover response from the second device.

* * * * *